United States Patent
Berkbuegler

(10) Patent No.: US 10,662,049 B2
(45) Date of Patent: May 26, 2020

(54) APPARATUS AND METHOD FOR RAISING A LADDER TREE STAND

(71) Applicant: Ronald Berkbuegler, Troy, IL (US)

(72) Inventor: Ronald Berkbuegler, Troy, IL (US)

( * ) Notice: Subject to any disclaimer, the term of this patent is extended or adjusted under 35 U.S.C. 154(b) by 0 days.

(21) Appl. No.: 16/377,568

(22) Filed: Apr. 8, 2019

(65) Prior Publication Data

US 2019/0233269 A1 Aug. 1, 2019

Related U.S. Application Data

(63) Continuation of application No. 15/398,937, filed on Jan. 5, 2017, now Pat. No. 10,315,901.

(51) Int. Cl.
| | |
|---|---|
| *B66F 11/04* | (2006.01) |
| *E06C 1/34* | (2006.01) |
| *A01M 31/02* | (2006.01) |
| *E06C 1/39* | (2006.01) |
| *E06C 1/06* | (2006.01) |
| *E06C 7/16* | (2006.01) |
| *E06C 7/18* | (2006.01) |

(52) U.S. Cl.
CPC ............ *B66F 11/04* (2013.01); *A01M 31/02* (2013.01); *E06C 1/06* (2013.01); *E06C 1/34* (2013.01); *E06C 1/39* (2013.01); *E06C 7/16* (2013.01); *E06C 7/182* (2013.01); *E06C 7/188* (2013.01)

(58) Field of Classification Search
CPC ........... B66F 11/04; A01M 31/02; E06C 1/06; E06C 1/34; E06C 1/39; E06C 1/12; E06C 1/393; E06C 7/16; E06C 7/182; E06C 7/188
See application file for complete search history.

(56) References Cited

U.S. PATENT DOCUMENTS

| | | | |
|---|---|---|---|
| 1,964,067 | A | 6/1934 | Leach |
| 2,232,414 | A | 2/1941 | Swann |
| 2,775,489 | A | 12/1956 | Hagadorn |
| 3,336,999 | A | 8/1967 | McSwain |
| 3,902,700 | A | 9/1975 | Cox |
| 4,090,587 | A | 5/1978 | Pyle |
| 4,467,890 | A | 8/1984 | McCallum et al. |
| 4,469,195 | A | 9/1984 | Sartain |

(Continued)

FOREIGN PATENT DOCUMENTS

FR        2622630 A1    5/1989

*Primary Examiner* — Michael E Gallion
(74) *Attorney, Agent, or Firm* — Young Basile Hanlon & MacFarlane, P.C.

(57) ABSTRACT

A ladder tree stand raising apparatus for raising a ladder tree stand into position adjacent to a tree. The apparatus comprising an elongated member, a first lateral member, and a second lateral member. The elongated member having a first end and a second end. The first end of the elongated member is connectable to the tree. The first lateral member is connected to the second end of the elongated member. The second lateral member is connected to the elongated member and spaced a distance from the first lateral member. The second lateral member has at least one arm having a substantially U-shaped configuration. The at least one arm is engageable with a rung of the ladder tree stand. An open end of the at least one arm extends away from the second lateral member.

20 Claims, 9 Drawing Sheets

(56) References Cited

U.S. PATENT DOCUMENTS

| | | | | |
|---|---|---|---|---|
| 4,579,198 A * | 4/1986 | Lee | ...................... | E04H 15/001 108/135 |
| 4,742,888 A * | 5/1988 | Amacker | .............. | A01M 31/02 182/116 |
| 4,946,004 A | 8/1990 | Henson | | |
| 4,995,475 A | 2/1991 | Berkbuegler | | |
| 4,995,476 A | 2/1991 | Buck | | |
| 5,109,954 A | 5/1992 | Skyba | | |
| 5,332,063 A | 7/1994 | Amacker | | |
| 5,388,664 A | 2/1995 | Bator | | |
| 5,590,738 A * | 1/1997 | Hunt | ..................... | A01M 31/02 182/116 |
| 5,590,739 A * | 1/1997 | High | ........................ | E06C 1/12 182/169 |
| 5,638,916 A | 6/1997 | Schneider | | |
| 5,791,436 A * | 8/1998 | Talley, Sr. | ............... | E06C 1/393 182/116 |
| 5,890,560 A * | 4/1999 | Sloop | ....................... | E06C 1/34 182/107 |
| 6,053,284 A * | 4/2000 | Fountain | ................... | E06C 7/42 182/180.2 |
| 6,089,350 A | 7/2000 | Hankins | | |
| 6,199,660 B1 * | 3/2001 | Meeks | .................. | A01M 31/02 182/116 |
| 6,715,585 B1 | 4/2004 | Overbaugh | | |
| 6,722,472 B2 | 4/2004 | Berkbuegler | | |
| 6,799,659 B2 | 10/2004 | Berkbuegler | | |
| 7,458,563 B1 * | 12/2008 | Liu | ...................... | A01M 31/02 254/334 |
| 7,802,653 B2 | 9/2010 | Louk et al. | | |
| 7,963,368 B2 | 6/2011 | Scudera et al. | | |
| 8,011,476 B1 | 9/2011 | Alcon | | |
| 8,122,998 B2 | 2/2012 | Liles | | |
| 8,424,642 B2 | 4/2013 | Lietz | | |
| 8,695,761 B1 | 4/2014 | Berkbuegler | | |
| 8,794,323 B2 | 8/2014 | Luce et al. | | |
| 8,794,383 B2 | 8/2014 | Furseth et al. | | |
| 8,807,278 B1 | 8/2014 | Galloway et al. | | |
| 8,997,932 B1 | 4/2015 | Ochoa | | |
| 9,038,778 B1 | 5/2015 | Carter et al. | | |
| 9,057,202 B2 | 6/2015 | Berkbuegler | | |
| 9,068,395 B1 | 6/2015 | Green | | |
| 9,073,734 B1 * | 7/2015 | Cates | .................... | B66C 23/203 |
| 9,326,500 B2 | 5/2016 | Overbaugh | | |
| 9,332,748 B2 | 5/2016 | Brown | | |
| 9,771,756 B1 * | 9/2017 | Gregoire | ................... | E06C 7/42 |
| 10,010,068 B2 | 7/2018 | Berkbuegler | | |
| 2002/0134620 A1 | 9/2002 | Meyer | | |
| 2004/0216952 A1 | 11/2004 | Woller | | |
| 2004/0216955 A1 * | 11/2004 | Unger | ...................... | E06C 1/34 182/206 |
| 2007/0000726 A1 | 1/2007 | Berkbuegler | | |
| 2008/0105490 A1 | 5/2008 | Butcher | | |
| 2008/0128204 A1 * | 6/2008 | Engstrom | ............. | A01M 31/02 182/116 |
| 2008/0142299 A1 | 6/2008 | Berkbuegler | | |
| 2008/0210916 A1 * | 9/2008 | Berkbuegler | ............ | E06C 1/10 254/131 |
| 2009/0223742 A1 * | 9/2009 | LePage | ................. | A01M 31/02 182/123 |
| 2009/0229916 A1 | 9/2009 | Berkbuegler | | |
| 2009/0229917 A1 | 9/2009 | Berkbuegler | | |
| 2009/0242328 A1 | 10/2009 | Cabrera et al. | | |
| 2010/0001803 A1 | 1/2010 | Ramirez Munoz | | |
| 2010/0089700 A1 * | 4/2010 | Scudera | ................. | A63B 27/00 182/133 |
| 2011/0291062 A1 * | 12/2011 | Lukes | ..................... | B66D 3/04 254/334 |
| 2012/0080266 A1 * | 4/2012 | Brock | .................... | E04G 3/243 182/107 |
| 2012/0097481 A1 | 4/2012 | Schienke et al. | | |
| 2013/0068560 A1 * | 3/2013 | Estep | ..................... | E06C 7/10 182/107 |
| 2013/0327908 A1 | 12/2013 | Brown | | |
| 2014/0182969 A1 * | 7/2014 | Overbaugh | ........... | A01M 31/02 182/116 |
| 2015/0047924 A1 * | 2/2015 | Graham, Sr. | ........... | E06C 7/188 182/107 |
| 2016/0153234 A1 * | 6/2016 | Mazanek | ................. | E06C 7/06 182/129 |
| 2016/0227761 A1 | 8/2016 | Overbaugh | | |
| 2017/0142959 A1 * | 5/2017 | Berkbuegler | ......... | A01M 31/02 |
| 2018/0066474 A1 * | 3/2018 | Johansson | ................ | E04G 5/14 |

\* cited by examiner

FIG. 4
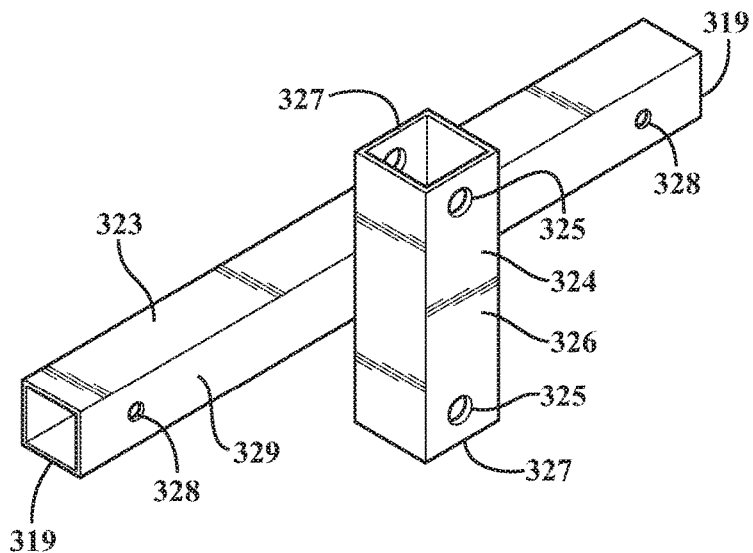
FIG. 5
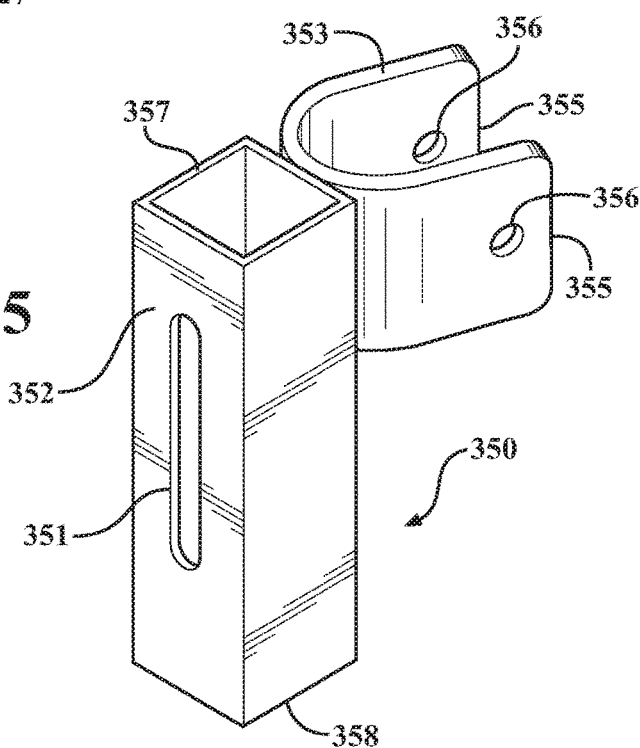
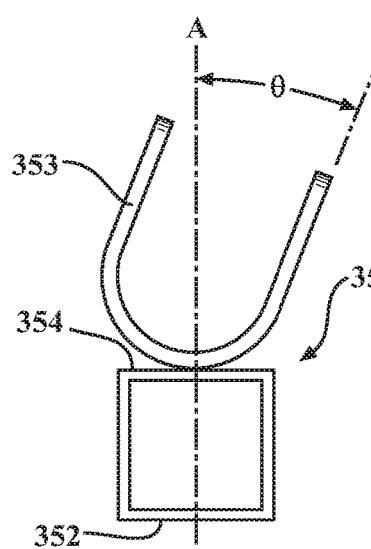
FIG. 6

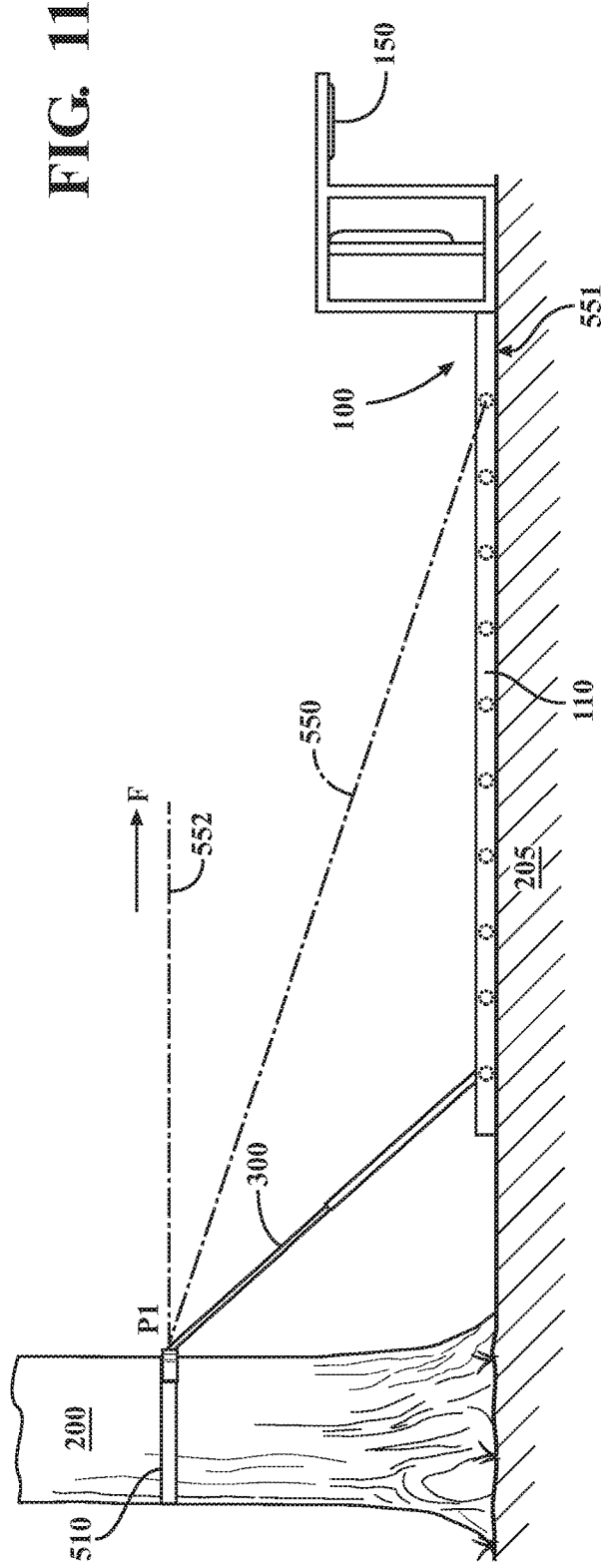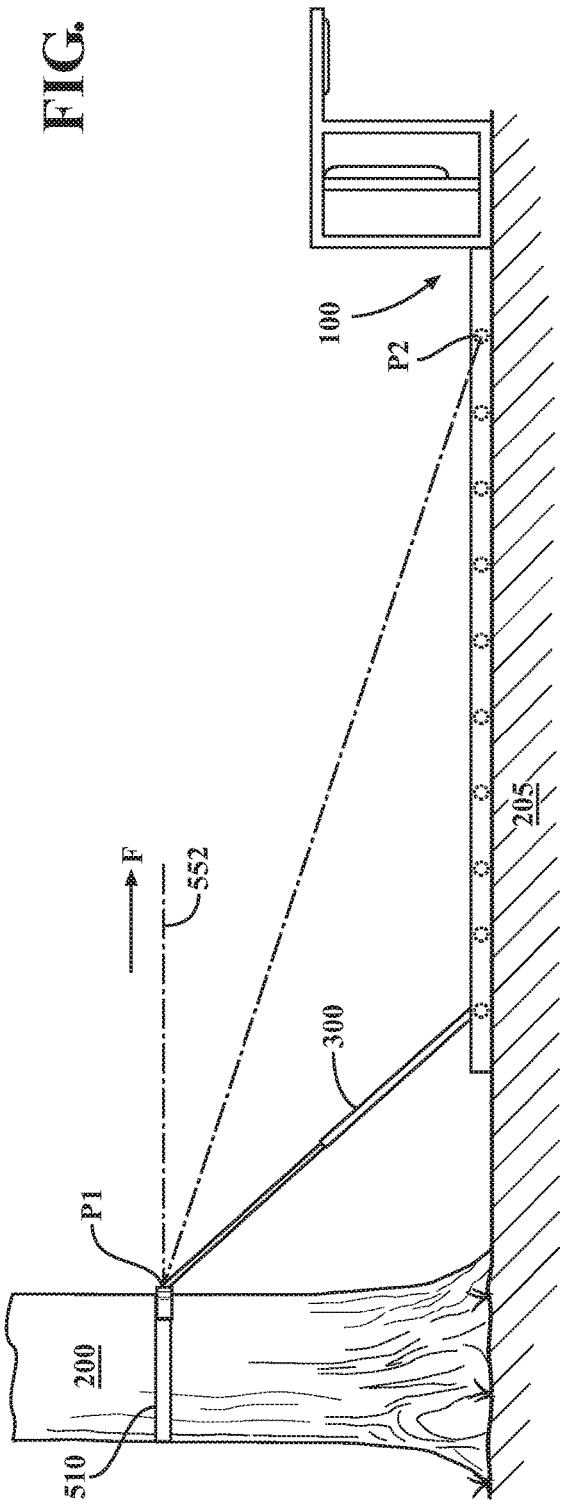

APPARATUS AND METHOD FOR RAISING A LADDER TREE STAND

CROSS-REFERENCE TO RELATED APPLICATION(S)

This application is a continuation of U.S. patent application Ser. No. 15/398,937, filed Jan. 5, 2017, the entire disclosure of which is incorporated by reference herein.

TECHNICAL FIELD

This disclosure relates generally to hunting tree stands, and more particularly, to apparatuses, assemblies, and methods that can be used with a hunting tree stand, such as a ladder stand, to raise the tree stand into position adjacent to a tree.

BACKGROUND

Tree stands and platforms are used by hunters to elevate the hunter above the ground level. The elevated vantage point allows the hunter to see over brush and vegetation that would otherwise impair the hunter's view of approaching game. As the likelihood of seeing game increases, the likelihood of a successful hunt should also increase for the hunter who uses a tree stand.

Common types of tree stands and platforms include climbing stands, ladder stands, and hanging stands, among others. Each type of tree stand has its advantages and disadvantages. For example, ladder stands require little to no assembly, as ladder stands are typically preassembled. However, ladder stands can be bulky and heavy, even if the ladder stand is made from a lightweight metal. As a result, ladder stands can be cumbersome and difficult to transport, position, and secure, thereby requiring two or three individuals to accomplish these tasks.

SUMMARY

Disclosed herein are implementations of an apparatus and method for raising a hunting tree stand into position. In one implementation, a ladder tree stand raising apparatus comprises an elongated member, a first lateral member, and a second lateral member. The elongated member has a first end and a second end, wherein the first end of the elongated member is connectable to a tree. The first lateral member is connected to the second end of the elongated member, and the second lateral member is connected to the elongated member and spaced a distance from the first lateral member. The second lateral member has at least one arm having a substantially U-shaped configuration. The at least one arm is engageable with a rung of the ladder tree stand. An open end of the at least one arm extends away from the second lateral member.

The first and second lateral members can be substantially parallel to one another and substantially perpendicular to the elongated member. There can be arms attached to each end of the second lateral member. The arms can be tilted in relation to a base of the second lateral member. A length of the elongated member can be adjustable. The apparatus can include a substantially arcuate member connected to the second end of the elongated member. An open end of the substantially arcuate member can extend away from the elongated member. The first and second lateral members can have a substantially rectangular cross-sectional configuration.

The elongated member can comprise a first elongated member and a second elongated member telescopically connected to the first elongated member. The apparatus can include a substantially arcuate member connected to the second elongated member. An open end of the substantially arcuate member can extend away from the first and second elongated members. A buckle can be connected to the second elongated member adjacent to the substantially arcuate member. A ring can be connected to the second elongated member adjacent to the substantially arcuate member. The ring can extend in a substantially perpendicular manner from the second elongated member.

In another implementation, an assembly for raising a ladder tree stand into position adjacent to a tree comprises at least one pulley, a ladder support, and a rope. The ladder support has an elongated member and a lateral member connected substantially perpendicular to the elongated member. The lateral member has at least one arm with a substantially U-shaped configuration. A first end of the ladder support is angled against the tree. A second end of the ladder support is spaced a distance from the tree. A rung of the ladder tree stand is inserted within an open end of the at least one arm of the lateral member. The rope is connected to the ladder tree stand and extends over the at least one pulley. When the rope is pulled away from the tree, the rung of the ladder tree stand pivots within the open end of the at least one arm of the lateral member, and the ladder tree stand raises into the position adjacent to the tree. A strap can secure the first end of the ladder support to the tree. The at least one pulley can be connected to the tree, and the rope can be connected to the ladder tree stand. There can be two pulleys, wherein one of the two pulleys can be connected to the tree, and the other of the two pulleys can be connected to the ladder tree stand. The rope can be connected to the tree and extend over the two pulleys.

In yet another implementation, a method of raising a ladder tree stand into position adjacent to a tree is provided. A ladder support is positioned adjacent to the tree and has an elongated member with one end connected to the tree and the other end connected to ground adjacent to the tree. A rung of the ladder tree stand is positioned within the arm of the ladder support. A first pulley is connected to the ladder tree stand, and a second pulley is connected to the tree. A first end of a rope is secured to the tree. The rope extends over the first pulley and the second pulley. A second end of the rope is pulled away from the tree to raise the ladder tree stand into position. The rung of the ladder tree stand pivots within the arm of the ladder tree support as the ladder tree stand is raised.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is a rear, perspective view of an adapter and a body of a second lateral member of the ladder support.

FIG. 5 is a rear, perspective view of an extender of the second lateral member of the ladder support.

FIG. 6 is a side view of the extender of the second lateral member of the ladder support.

FIG. 11 is a schematic drawing showing a one-pulley implementation of the assembly for raising the ladder tree stand.

FIG. 12 is a schematic drawing showing a two-pulley implementation of the assembly for raising the ladder tree stand.

DETAILED DESCRIPTION

Figure 1:
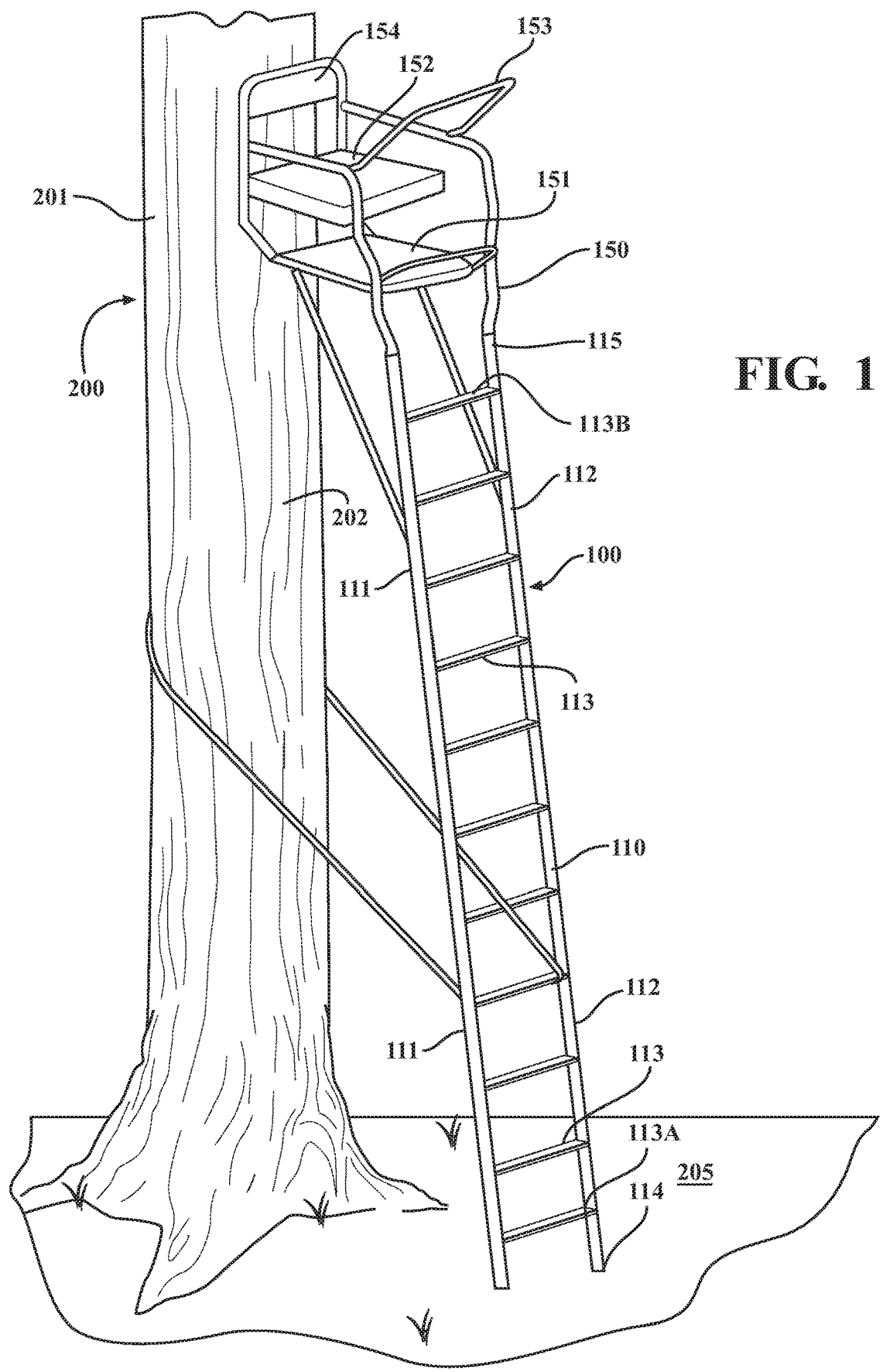
FIG. 1 is a perspective view of a ladder tree stand attached to a tree.

An apparatus and method for raising ladder tree stands into position adjacent to a tree are disclosed herein, which when implemented, minimize the effort required to raise the ladder tree stand into position. FIG. 1 illustrates a ladder tree stand 100 that has been raised into position adjacent to a tree 200. The tree 200 can be substantially vertical with little or no limbs 201 extruding from a portion 202 of the tree 200 where the ladder tree stand 100 rests against the tree 200. The limbs 201 can be located opposite and/or above the portion 202 of the tree 200 where the ladder tree stand 100 is attached. To provide stability for the ladder tree stand 100, ground 205 surrounding the tree 200 can be substantially level.

As the name implies, the ladder tree stand 100 is comprised of a ladder 110 attached to a tree stand 150. The ladder 110 can be permanently attached to the tree stand 150, resulting in a unitary design. Alternatively, the ladder 110 can be disconnectable from the tree stand 150 to assist with transporting the ladder tree stand 100. Regardless of the chosen design, the ladder 110 and the tree stand 150 can be fabricated from any suitable material, such as steel, aluminum, or carbon fiber.

The ladder 110 is comprised of a first side rail 111, a second side rail 112, and rungs 113. The first and second side rails 111, 112 are substantially similar to one another, extending longitudinally from a first end 114 of the ladder 110 to a second end 115 of the ladder 110. The rungs 113 are spaced in a substantially equidistant manner along the first and second side rails 111, 112 with each rung 113 extending laterally from the first side rail 111 to the second side rail 112. When the ladder tree stand 100 is attached to the tree 200, the first and second side rails 111, 112 of the ladder 110 are substantially parallel to the tree 200. The rung 113 closest to the first end 114 is a lowermost rung 113A, and the rung 113 closest to the second end 115 is an uppermost rung 113B.

The tree stand 150 is connected to the second end 115 of the ladder 110, which results in the tree stand 150 being elevated off of the ground 205 when the ladder tree stand 100 is positioned adjacent to the tree 200. Numerous implementations of the tree stand 150 are known. As illustrated in the non-limiting example, the tree stand 150 provides a platform 151, a seat 152, and a rifle rest 153. The platform 151 and the seat 152 allow a hunter (not shown) to alternatively stand or sit in the tree stand 150. The rifle rest 153 can be used by the hunter to steady a firearm (not shown). When the ladder tree stand 100 is attached to the tree 200, a back 154 of the seat 152 can be adjacent to the tree 200 so that the seat 152 or the tree 200 do not interfere with the hunter's view from the tree stand 150.

Figure 2:
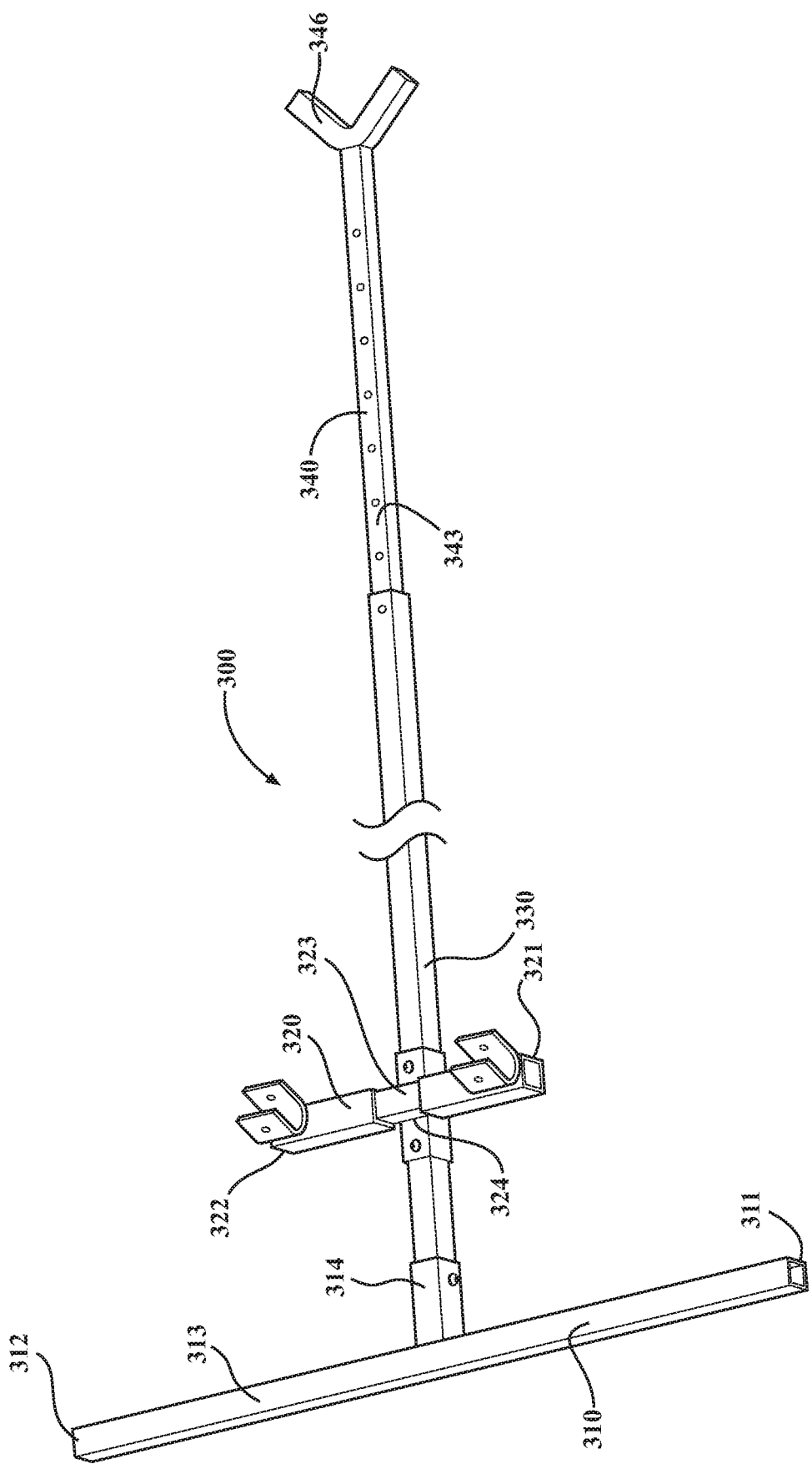
FIG. 2 is a front, perspective view of a ladder support of an assembly for raising the ladder tree stand.
Figure 3:
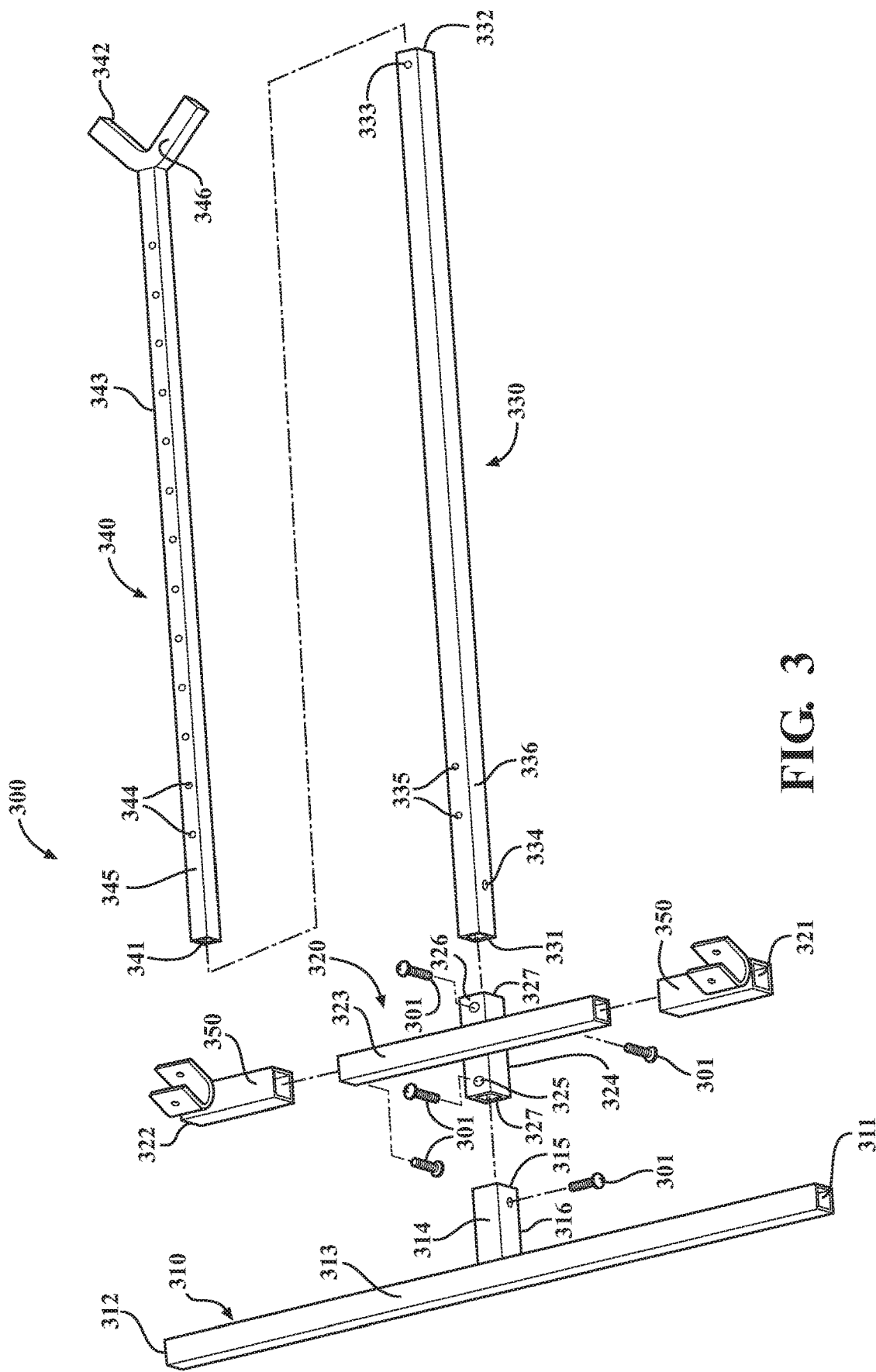
FIG. 3 is an exploded, perspective view of the ladder support.

A ladder support 300, which is illustrated in FIGS. 2-3, can be used as part of an assembly to raise the ladder tree stand 100 into position against the tree 200. The ladder support 300 can be fabricated from any suitable material, such as steel, aluminum, or carbon fiber, and can be comprised of a first lateral member 310, a second lateral member 320, a first elongated member 330, and a second elongated member 340. The first and second lateral members 310, 320 and the second elongated member 340 can be connected to the first elongated member 330.

The first lateral member 310 is comprised of a body 313 and an adapter 314. The adapter 314 can be connected to the body 313 of the first lateral member 310 approximately halfway between a first end 311 and a second end 312 of the body 313 with the adapter 314 extending substantially perpendicular from the body 313, resulting in a substantially T-shaped configuration. The adapter 314 can be integrally formed with or welded to the body 313. The body 313 of the first lateral member 310 can be hollow and have a substantially rectangular cross-sectional configuration.

To allow a first end 331 of the first elongated member 330 to be housed within the adapter 314, the adapter 314 can have a similar cross-sectional configuration as the first elongated member 330 with the dimensions of the cross-sectional configuration of the adapter 314 being slightly larger than the dimensions of the cross-sectional configuration of the first elongated member 330. The first elongated member 330 and the adapter 314 of the first lateral member 310 can be hollow and have a substantially rectangular cross-sectional configuration. To secure the first lateral member 310 to the first elongated member 330, the adapter 314 can have an aperture 315 extending through a first outer surface 316 that aligns with an aperture 334 extending through an outer surface 336 of the first elongated member 330. The apertures 315, 334 can receive a fastener 301, for connecting the first lateral member 310 to the first elongated member 330.

The first elongated member 330 can extend through and be secured to an adapter 324 of the second lateral member 320. The second lateral member 320 extends from a first end 321 to a second end 322 and is comprised of a body 323, the adapter 324, and two extenders 350. To allow the first elongated member 330 to extend through the adapter 324 of the second lateral member 320, the adapter 324 can have the same cross-sectional configuration as the first elongated member 330 with the measurements of the cross-sectional configuration of the adapter 324 of the second lateral member 320 being slightly larger than the measurements of the cross-sectional configuration of the first elongated member 330. To secure the second lateral member 320 to the first elongated member 330, the adapter 324 of the second lateral member 320 can be provided with apertures 325 extending through an outer surface 326 that align with corresponding apertures 335 extending through the outer surface 336 of the first elongated member 330. The apertures 325, 335 are capable of receiving fasteners 301 to secure the second lateral member 320 to the first elongated member 330.

Approximately halfway between ends 327 of the adapter 324 of the second lateral member 320, the body 323 can be connected to the adapter 324 in a substantially perpendicular manner, resulting in a substantially t-shaped configuration. The body 323 can be integrally formed with or welded to the adapter 324 of the second lateral member 320. To secure the extenders 350 to the body 323 of the second lateral member 320, the body 323 can be provided with apertures 328 extending through an outer surface 329 of the body 323, as illustrated in FIG. 4.

Turning back to FIGS. 2-3, the body 323 of the second lateral member 320 can extend through the extenders 350. The body 323 and the extenders 350 can have similar cross-sectional configurations with the measurements of the cross-sectional configuration of the extenders 350 being slightly larger than the measurements of the cross-sectional configuration of the body 323. Each extender 350 can be provided with a slot 351 extending through and centered on an outer surface 352 (shown in FIG. 5) and an arm 353 having a substantially U-shaped configuration. The slots 351 in the extenders 350 and the apertures 328 in the body 323 are capable of receiving fasteners 301 to secure the extenders 350 to the body 323 of the second lateral member 320. The slot 351 configuration allows the position of the extenders 350 to be varied along the body 323 of the second lateral member 320. Alternatively, an aperture (not shown) could be used instead of the slot 351.

The arm 353 of the extender 350 of the second lateral member 320 can be connected to an outer surface 354 of the extender 350 that is opposite the outer surface 352 containing the slot 351. The arm 353 can be integrally formed with or welded to the extender 350 adjacent to an end 357 of the extender 350. Free ends 355 of the arm 353 can be provided with apertures 356 extending therethrough that are capable of receiving a removable fastener 359, such as a pin with a clip.

As shown in FIG. 6, the arm 353 can be tilted or offset by an angle θ so that the free ends 355 of the arm 353 are not substantially parallel to an axis A that extends substantially perpendicular to the outer surfaces 352, 354. If the arms 353 of the extenders 350 are tilted or offset, the angle θ can be mirrored in an opposite direction for one of the extenders 350 so that the arms 353 tilt in the same direction when the extenders 350 are attached to the body 323 of the second lateral member 320 with the ends 357 on an outer perimeter of the second lateral member 320.

Turning back to FIGS. 2-3, the second elongated member 340 can be partially housed within a second end 332 of the first elongated member 330. The second elongated member 340 extends longitudinally from a first end 341 to a second end 342 and is comprised of a body 343 and a connector 346. The cross-sectional configuration of the body 343 of the second elongated member 340 can be slightly smaller than the cross-sectional configuration of the first elongated member 330 so that the body 343 of the second elongated member 340 can be received within the second end 332 of the first elongated member 330 in a telescopic manner. The first elongated member 330 and the body 343 of the second elongated member 340 can be hollow and have a substantially rectangular cross-sectional configuration. The connector 346 can be the attachment point of the ladder support 300 to the tree 200 and can be integral with or welded to the body 343 of the second elongated member 340. As illustrated, the connector 346 has a substantially V-shaped configuration with the center of the V-shape connected to the body 343 of the second elongated member 340. Other configurations could be used, such as a substantially U-shaped configuration.

To adjust the positioning of the second elongated member 340 with respect to the first elongated member 330, apertures 344 can extend through an outer surface 345 of the body 343 of the second elongated member 340 that are capable of receiving the removable fastener 359, such as a pin with a clip. The apertures 344 can have a substantially similar diameter and be laterally centered on the outer surface 345 of the body 343 of the second elongated member 340. The apertures 344 can be longitudinally spaced in a substantially equidistant manner along the outer surface 345 of the body 343. In the illustrated, non-limiting example, there are 13 apertures 344 in the body 343 of the second elongated member 340.

Figure 7:
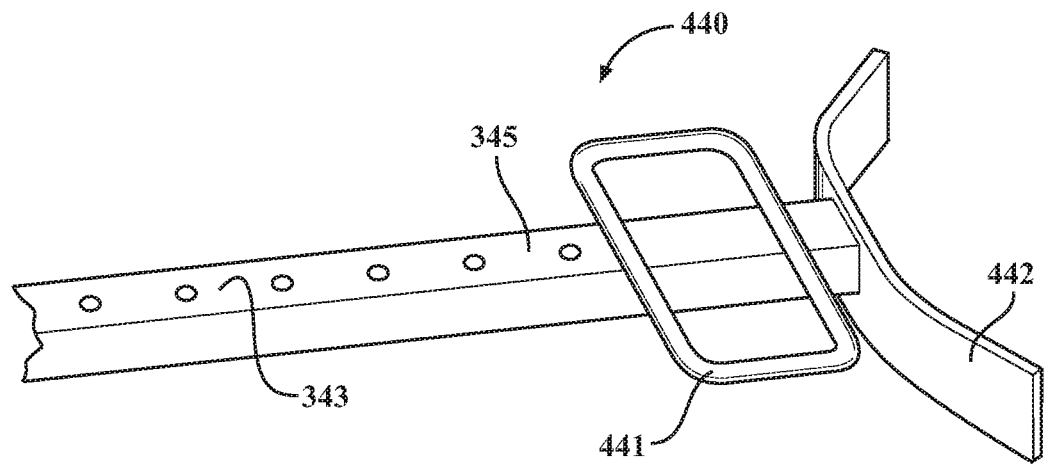
FIG. 7 is a perspective view of an alternative implementation of an end of a second elongated member of the ladder support.

An alternative embodiment of the second elongated member 340 is shown in FIG. 7. An alternative embodiment 440 of the second elongated member 340 is substantially the same as the embodiment previously described except as noted. A connector 442 of the alternative embodiment 440 has a substantially U-shaped configuration. The alternative embodiment 440 of the second elongated member 340 also provides a buckle 441 connected to the body 343 of the second elongated member 340 adjacent to the connector 442. The buckle 441 can have a substantially rectangular configuration and be substantially flush with the outer surface 345 of the body 343 of the second elongated member 340. The buckle 441 can be welded to or integrally formed with the body 343 of the second elongated member 340 and can be used to assist with the connection of the ladder support 300 to the tree 200 as will be described.

Figure 8:
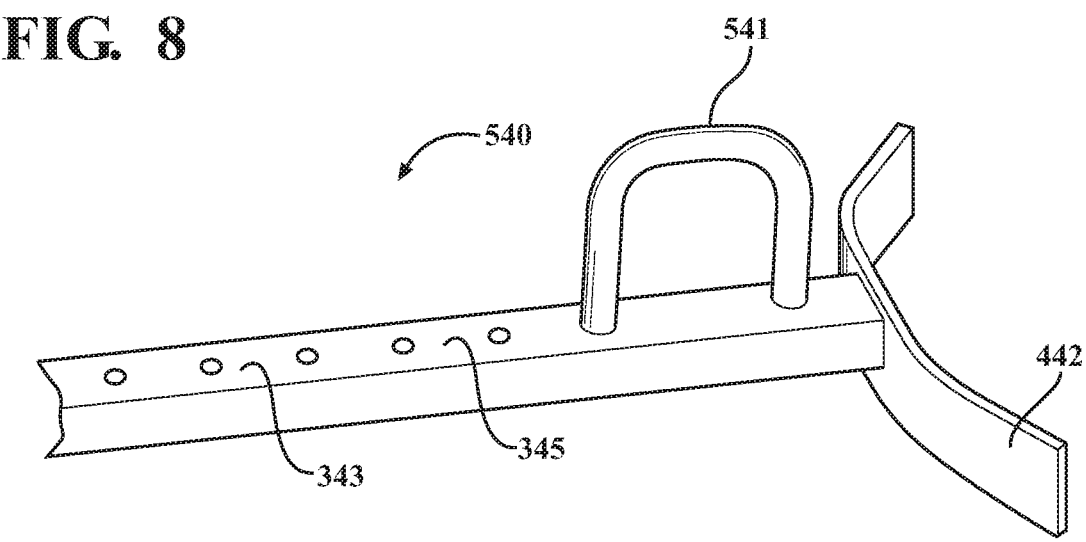
FIG. 8 is a perspective view of another alternative implementation of the end of the second elongated member of the ladder support.

A second alternative embodiment 540 of the second elongated member 340 is shown in FIG. 8 and is substantially the same as the embodiments previously described except as noted. In the second alternative embodiment 540, a loop 541 is connected to the body 343 of the second elongated member 340 adjacent to the connector 442. The loop 541 can have a substantially ring-shaped configuration and be substantially perpendicular to the outer surface 345 of the body 343 of the second elongated member 340. The loop 541 can be welded to or integrally formed with the body 343 of the second elongated member 340 and can be used to assist with the connection of the ladder support 300 to the tree 200 as will be described.

Figure 9:
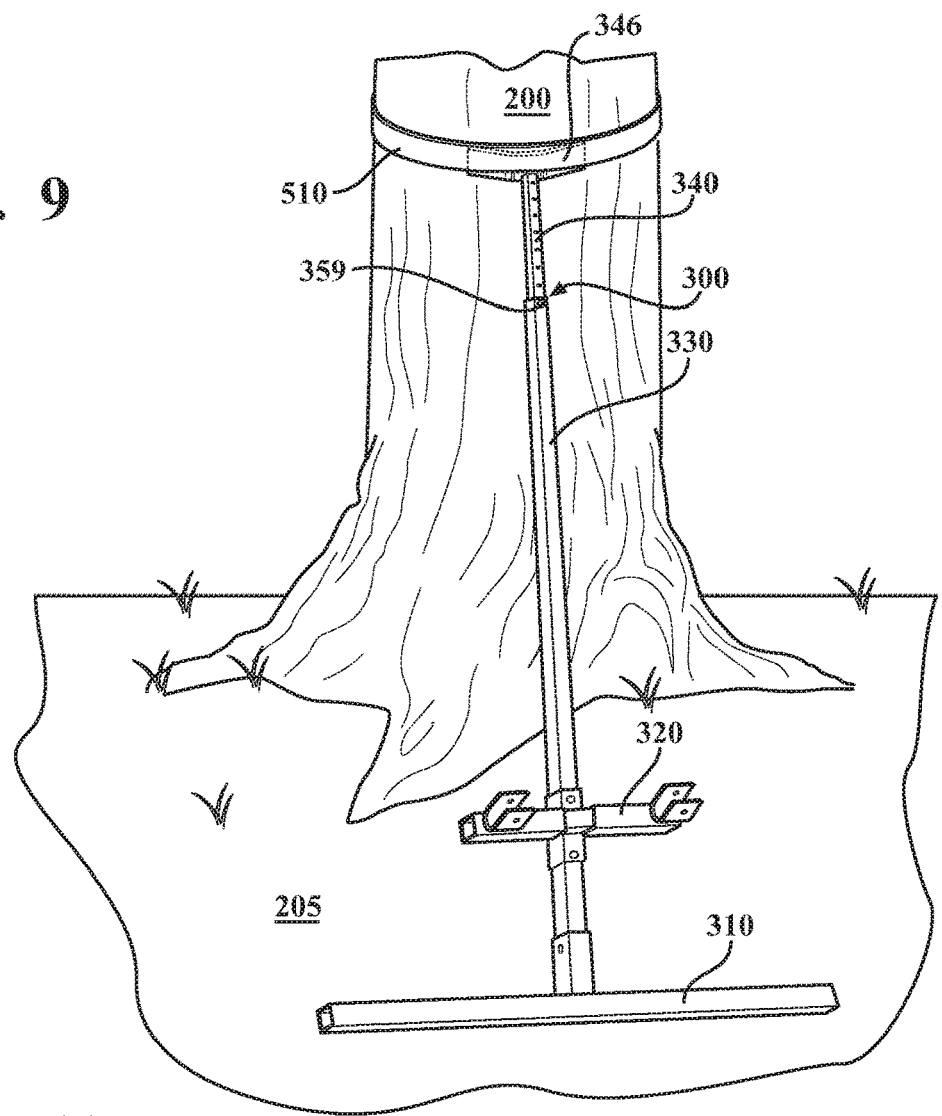
FIG. 9 is a front view of the ladder support attached to the tree.
Figure 10:
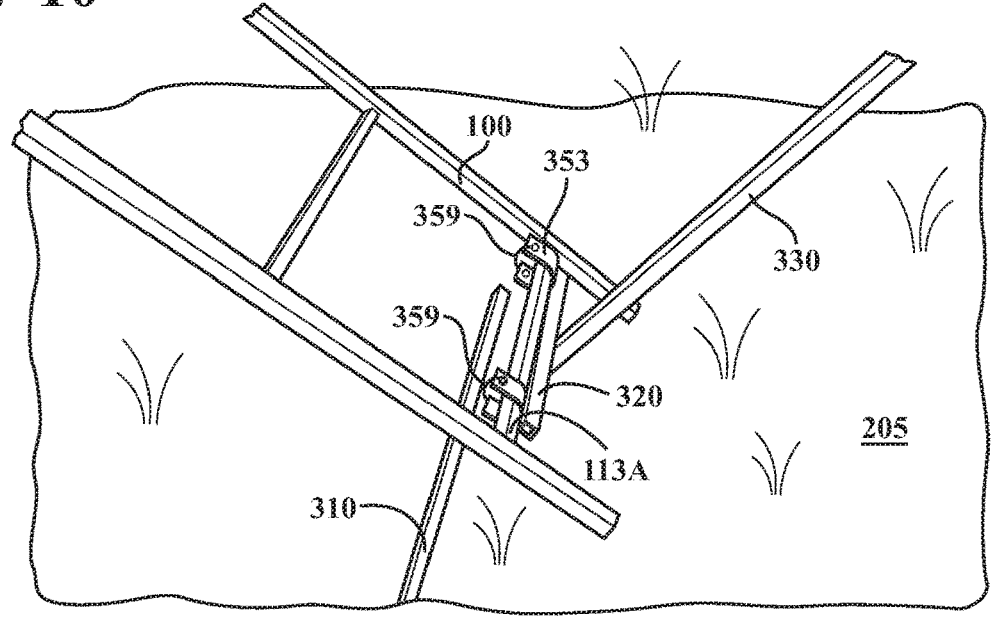
FIG. 10 is a perspective view of a lowermost rung of the ladder tree stand attached to the ladder support.

FIG. 9 shows the ladder support 300 connected to the tree 200. The first lateral member 310 is positioned on the ground 205 a distance from the tree 200 with the ladder support 300 angled so that the connector 346 of the second elongated member 340 rests against the tree 200. The cumulative length of the first elongated member 330 and the second elongated member 340 can be adjusted as needed by removing the removable fastener 359, telescopically adjusting the first and second elongated members 330, 340, and using a different aperture 344 to secure the second elongated member 340 to the first elongated member 330. To secure the ladder support 300 to the tree 200, a strap 510 can be secured around the tree 200 and the ladder support 300. If the ladder support 300 provides the buckle 441 or the loop 541 as described in the alternative embodiments 440, 540, the strap 510 is extended through the buckle 441 or the loop 541. Once the ladder support 300 is in position, the lowermost rung 113A of the ladder tree stand 100 can be inserted between the free ends 355 of the arm 353 of the second lateral member 320, as shown in FIG. 10. The removable fasteners 359 can be inserted through the apertures 356 in the arm 353 of the second lateral member 320 to secure the lowermost rung 113A of the ladder tree stand 100 to the ladder support 300.

The ladder support 300 can be used with various implementations of an assembly. An implementation that uses one pulley to raise the ladder tree stand 100 is illustrated in FIG. 11. A pulley P is positioned adjacent to where the ladder support 300 is connected to the tree 200. Possible examples of connections include connecting the pulley P to a strap wrapped around the tree 200 or connecting the pulley P to the loop 541 of the ladder support 300. A first end 551 of a rope 550 is secured to the ladder tree stand 100. In some implementations, the first end 551 of the rope 550 is secured to the tree stand 150, while in other implementations the first end 551 of the rope 550 is secured to the ladder 110 at a point that is closer to the second end 115 of the ladder 110 than the first end 114 of the ladder 110. Regardless of where the first end 551 of the rope 550 is secured to the ladder tree stand 100, a second end 552 of the rope 550 is looped over the pulley P and fed away from the tree 200 where the rope 550 can be pulled to raise the ladder tree stand 100.

In another implementation, two pulleys are used to raise the ladder tree stand 100, as illustrated in FIG. 12. In the two-pulley implementation, a first pulley $P_1$ is positioned in substantially the same position as the pulley P in the one-pulley implementation. A second pulley $P_2$ is positioned adjacent to the tree stand 150 and/or the second end 115 of the ladder 110. The second pulley $P_2$ could be connected to the ladder tree stand 100 directly or a rope could be used to connect the second pulley $P_2$ to the ladder tree stand 100. In the two-pulley implementation, the first end 551 of the rope 550 is secured adjacent to the first pulley $P_1$ with the second end 552 of the rope 550 looped over the second pulley $P_2$ and then the first pulley $P_1$ before being fed away from the tree 200 where the rope 550 can be pulled to raise the ladder tree stand 100.

Figure 13:
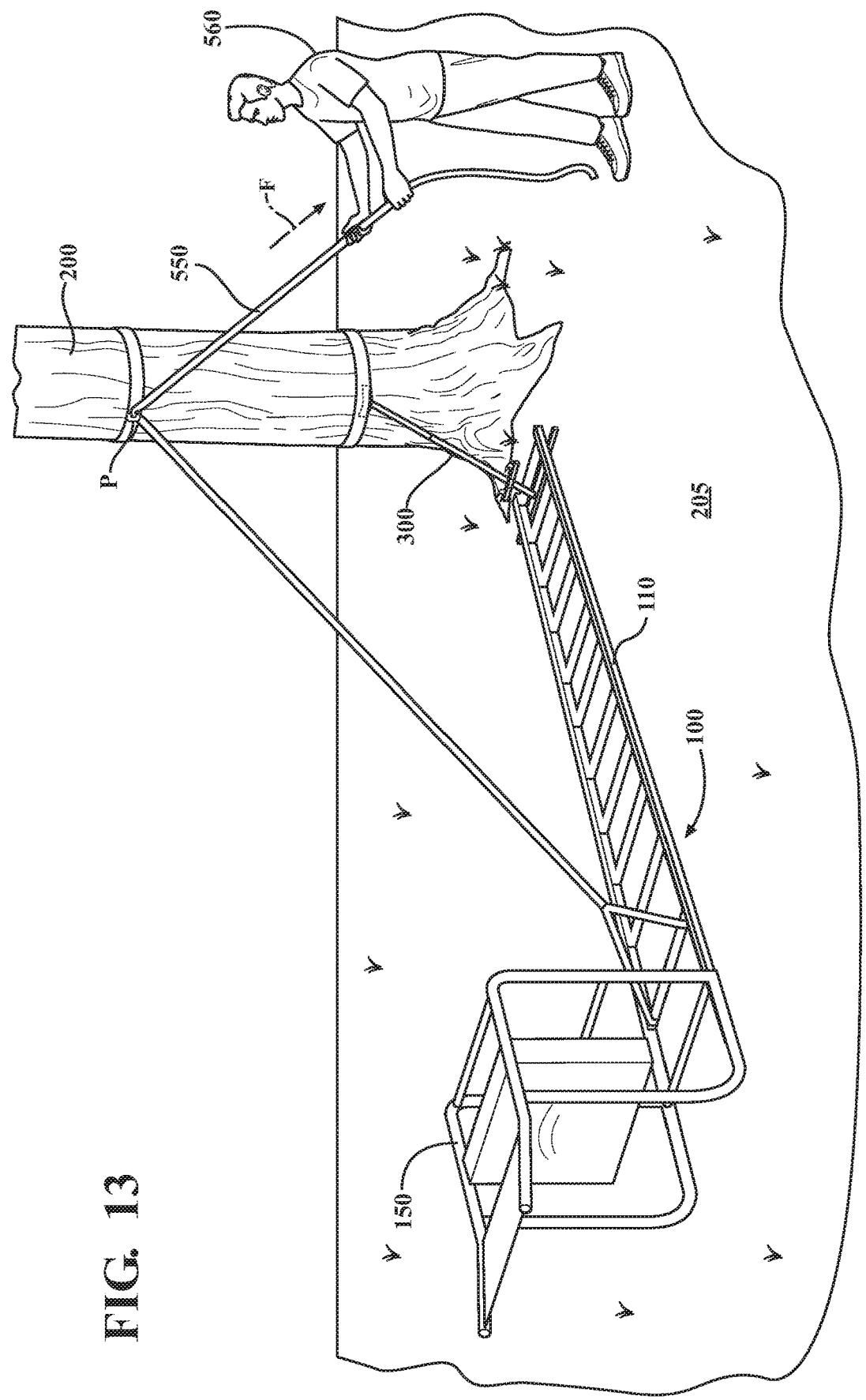
FIG. 13 is a perspective view of the assembly being used to raise the ladder tree stand according to a manual implementation.
Figure 14:
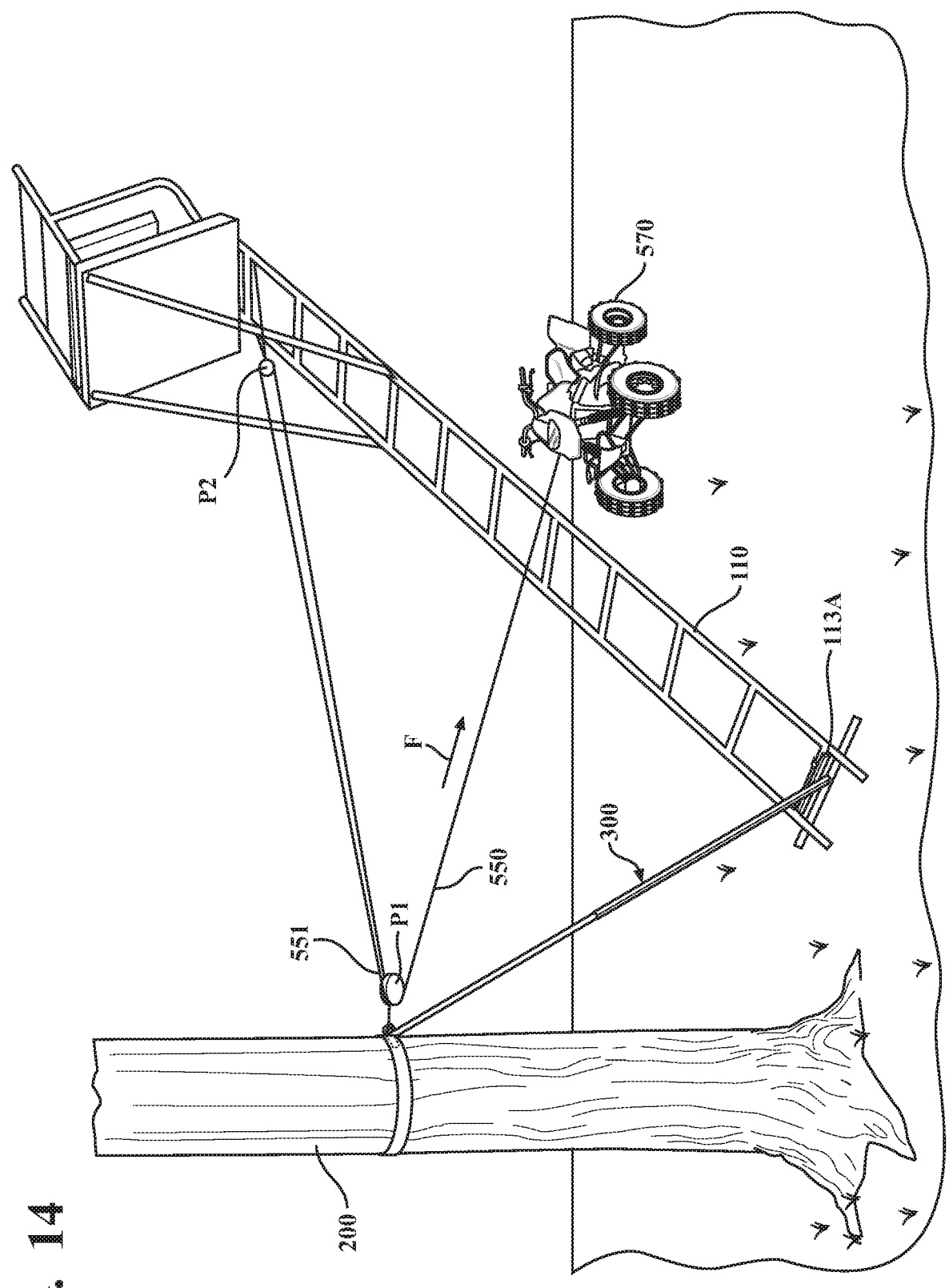
FIG. 14 is a perspective view of the assembly being used to raise the ladder tree stand according to a vehicle-assisted implementation.

Regardless of whether the one-pulley or two-pulley implementation is used, the lowermost rung 113A of the ladder 110 will pivot within the arms 353 of the second lateral member 320, and the ladder tree stand 100 will raise into position when sufficient force F is exerted to pull the rope 550 away from the tree 200 and raise the ladder tree stand 100 along an arcuate path. The force F can be generated by an individual 560 walking away from the tree 200 while pulling the rope 550 as illustrated in FIG. 13. Alternatively, the rope 550 could be attached to a vehicle 570, such as an all-terrain vehicle, so that the force F could be generated by driving the vehicle 570 away from the tree 200. Once the ladder tree stand 100 is in position, the ladder tree stand 100 can be secured to the tree 200 through conventional means. The lowermost rung 113A of the ladder tree stand 100 can remain in the arms 353 of the second lateral member 320 of the ladder support 300 or can be removed from the arms 353 and the first end 114 of the ladder 110 secured to the ground 205 using stakes (not shown).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for raising a ladder tree stand including a ladder having a pair of side rails connected by a plurality of rungs into position adjacent to a tree, the apparatus comprising:
    an elongated member having a first end and a second end, the first end being configured for engagement with the tree to secure the apparatus in relation to the tree;
    a first lateral member connected to the second end of the elongated member such that the first lateral member extends outwardly from the elongated member;
    a second lateral member connected to the elongated member at a location between the first and second ends of the elongated member such that the second lateral member extends outwardly from the elongated member at a fixed angle, the second lateral member being spaced a distance from the first lateral member; and
    at least one arm connected to the second lateral member, the at least one arm having a U-shaped configuration such that the at least one arm is engageable with a rung of the ladder.

2. The apparatus of claim 1, wherein the first and second lateral members extend in substantially parallel relation to each other.

3. The apparatus of claim 2, wherein the first and second lateral members extend in substantially perpendicular relation to the elongated member.

4. The apparatus of claim 1, wherein the elongated member is variable in length.

5. The apparatus of claim 4, wherein the elongated member includes a first elongated member, and a second elongated member telescopingly connected to the first elongated member.

6. The apparatus of claim 1, wherein the at least one arm includes an open end configured to receive the rung of the ladder.

7. The apparatus of claim 6, wherein the at least one arm includes a pair of legs connected by an arcuate segment, the legs defining the open end of the at least one arm and extending in transverse relation to the second lateral member.

8. The apparatus of claim 6, wherein the second lateral member defines a length extending along a first axis, the first axis extending transversely in relation to the elongated member, the at least one arm being oriented such that the at least one arm subtends an acute angle with a second axis extending in orthogonal relation to both the first axis and the elongated member.

9. The apparatus of claim 6, wherein the at least one arm includes a first arm and a second arm.

10. The apparatus of claim 6, wherein the at least one arm includes apertures configured to receive a fastener such that the rung of the ladder can be secured within the at least one arm.

11. An apparatus for raising a ladder tree stand including a ladder having a pair of side rails connected by a plurality of rungs into position adjacent to a tree, the apparatus comprising:
    an elongated member configured for engagement with the tree;
    a lateral member connected to the elongated member at a location between opposing ends of the elongated member such that the lateral member extends transversely in relation to the elongated member at a fixed angle; and
    at least one arm connected to the lateral member, the at least one arm being configured to receive a rung of the ladder such that the rung is pivotable within the at least one arm during raising of the ladder tree stand.

12. The apparatus of claim 11, wherein the at least one arm includes a U-shaped configuration.

13. The apparatus of claim 12, wherein the at least one arm includes a first end portion connected to the lateral member, and an open second end portion opposite the first end portion.

14. The apparatus of claim 13, wherein the first end portion of the at least one arm is fixedly connected to the lateral member.

15. The apparatus of claim 13, wherein the at least one arm includes a pair of legs connected by an arcuate segment, the legs defining the open second end portion of the at least one arm.

16. The apparatus of claim 15, wherein the legs extend in transverse relation to the lateral member.

17. The apparatus of claim 16, wherein the elongated member defines a length extending along a first axis, and the lateral member defines a length extending along a second axis transverse in relation to the first axis, the at least one arm being oriented such that the at least one arm subtends an acute angle with a third axis extending in orthogonal relation to both the first and second axes.

18. A method of raising a ladder tree stand including a ladder relative to a tree using an apparatus including an elongated member supporting a lateral member extending outwardly from the elongated member at a fixed angle and located between opposing ends of the elongated member, the method comprising:
    positioning a rung of the ladder within an arm supported by the lateral member, the rung extending horizontally between vertical side rails of the ladder; and
    applying a lifting force to the ladder tree stand such that the rung of the ladder pivots within the arm.

19. The method of claim 18, wherein positioning the rung of the ladder includes positioning the rung within a U-shaped channel defined by the arm.

20. The method of claim 19, wherein positioning the rung of the ladder includes orienting the rung such that the rung extends in substantially parallel relation to the lateral member supporting the arm, the lateral member extending transversely in relation to the elongated member.

* * * * *